United States Patent [19]

McCaw

[11] Patent Number: 4,791,832
[45] Date of Patent: Dec. 20, 1988

[54] CAGED HELICAL GEAR DIFFERENTIAL

[76] Inventor: Thomas M. McCaw, 512 Lingle Ave., Lafayette, Ind. 47901

[21] Appl. No.: 805,312

[22] Filed: Dec. 5, 1985

[51] Int. Cl.⁴ .............................................. F16H 1/38
[52] U.S. Cl. ........................................ 74/715; 74/710
[58] Field of Search .................... 74/715, 710, 710.5, 74/711, 665 GD

[56] References Cited

U.S. PATENT DOCUMENTS

| | | | |
|---|---|---|---|
| 1,719,803 | 7/1929 | Fickett | 74/711 |
| 1,988,183 | 1/1935 | Whitcomb | 74/711 |
| 2,666,343 | 1/1954 | Cassa-Massa | 74/711 |
| 2,859,641 | 11/1958 | Gleasman | 74/715 |
| 2,972,265 | 2/1961 | Walter | 74/711 |
| 3,237,483 | 3/1966 | Kelly et al. | 74/715 |
| 3,253,483 | 5/1966 | McCaw | 74/715 |
| 3,735,647 | 5/1973 | Gleasman | 74/715 |
| 3,886,813 | 6/1975 | Baremor | 74/711 X |
| 4,163,400 | 8/1979 | Fisher et al. | 74/710 |
| 4,191,071 | 3/1980 | Gleasman et al. | 74/715 |

Primary Examiner—Leslie A. Braun
Assistant Examiner—David Novais
Attorney, Agent, or Firm—Woodling, Krost and Rust

[57] ABSTRACT

A torque proportioning differential utilizing helical face side gears and helical pinions is disclosed which is equivalent in torque capacity and interchangeable with bevel gear differentials in the same case and which is economical to manufacture.

A differential structure, interchangeable with bevel gear differential components in the same case, composed of a drive cage in which are pocketed up to 8 helical pinions; two helical face side gears in concentric relationship on each side of the cage with teeth engaging the helical pinions; thrust-friction plates fixed alternately to the side gears and the cage and spring mechanism for pre-loading the friction plates. The helical face side gears connect with axle shafts to drive the load.

17 Claims, 4 Drawing Sheets

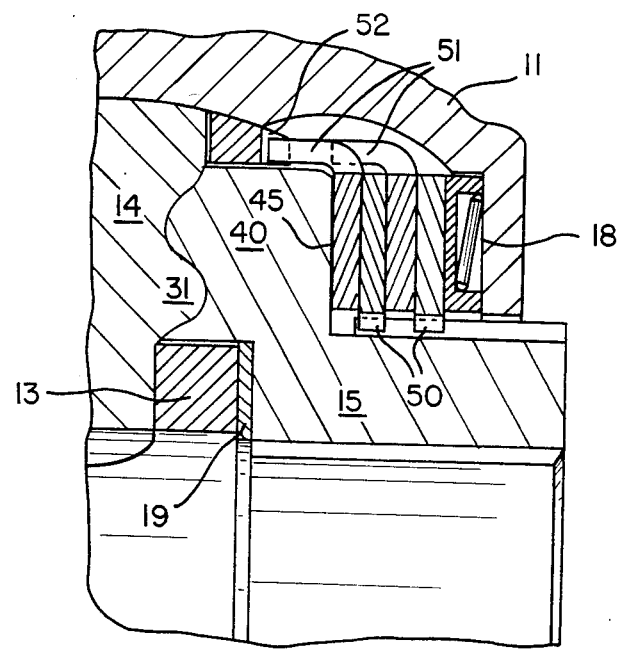
FIG.3
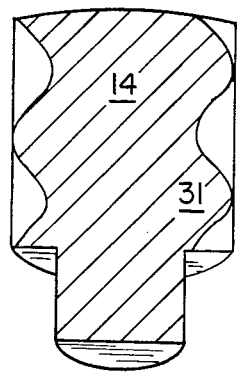
FIG.4
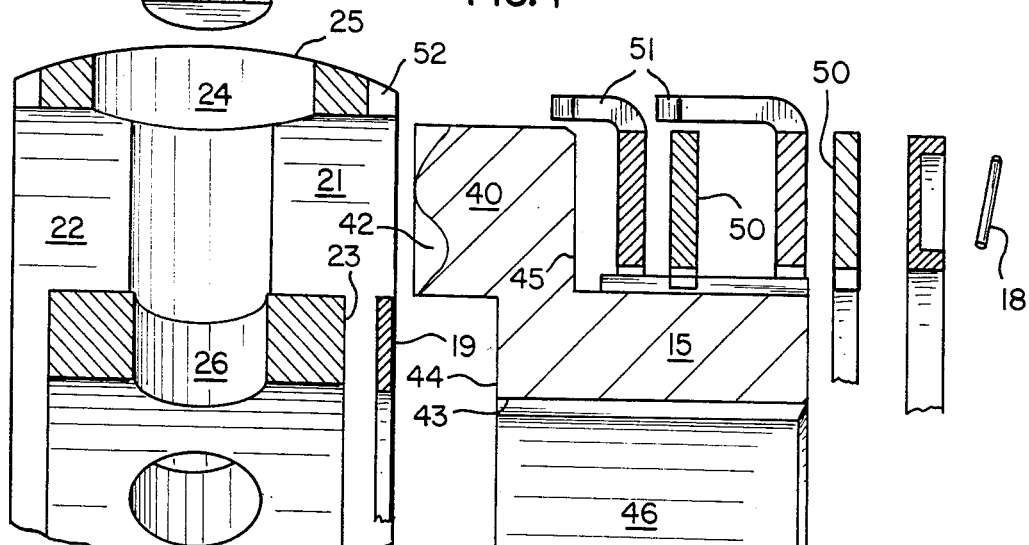

CAGED HELICAL GEAR DIFFERENTIAL

The invention of this application relates to a torque proportioning helical face gear differential.

It is an object of this invention to increase the torque capacity of helical gear differentials.

It is an object of this invention to provide differing degrees of torque proportioning in a differential.

It is an object of this invention to provide for a preloaded torque proportioning effect.

It is an object of this invention to reduce the size of helical gear differentials.

It is an object of this invention to reduce the cost of manufacture of helical gear differentials.

It is an object of this invention to provide torque proportioning differential components that are interchangeable with bevel gear differential components in the same case.

Other objects and a more complete understanding of the invention may be had by referring to the drawings in which:

FIG. 3 is an enlarged cutaway sectional side view of the preloaded semi-locking differential of FIG. 1.

FIG. 4 is a cutaway expanded view of FIG. 3.

DESCRIPTION

Figure 1:
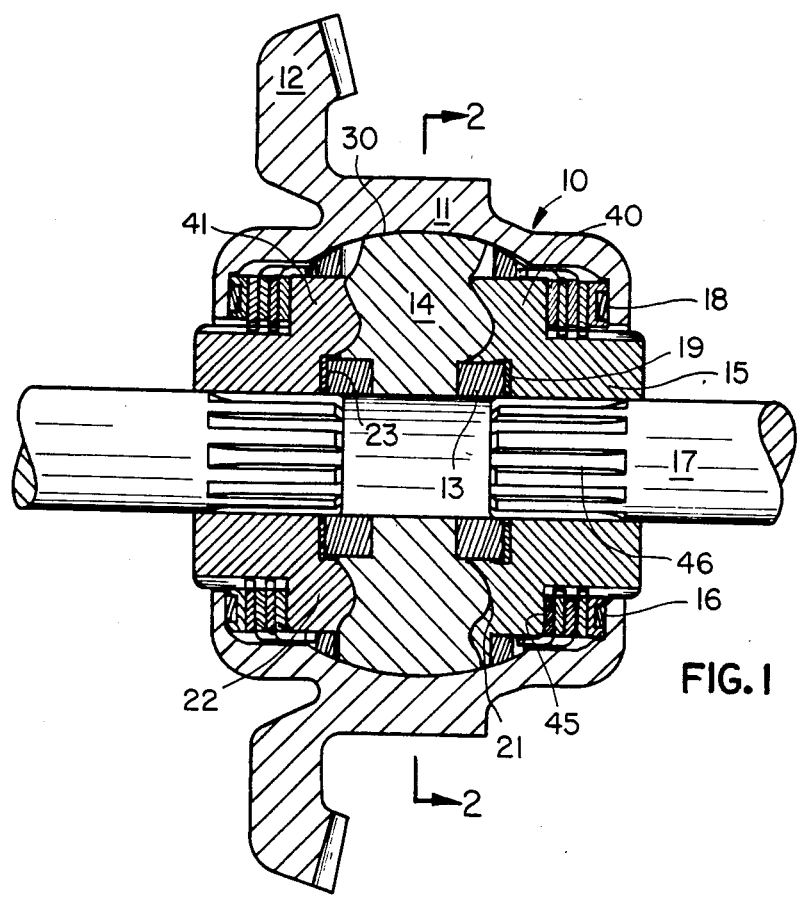
FIG. 1 is a cutaway side view of a complete differential incorporating the invention.

Helical face gear differentials are known in the art; for example U.S. Pat. No. 3,253,483. The differential design, however, is not often used due to serious limitations on operating capacity and performance. Past attempts to resolve these problems (by increasing the size or number of pinions, alteration of the helix angle, etc.) have not proven satisfactory. The invention of this current application resolves the problems in helical face gear differentials to produce a commercial torque proportioning product.

The caged helical gear differential 10 of the invention includes a case 11, a ring gear 12, a pinion cage 13, pinions 14, side gears 15 and friction plates 16.

The ring gear 12 is connected to a drive source in a conventional manner for rotating the case 11.

Figure 2:
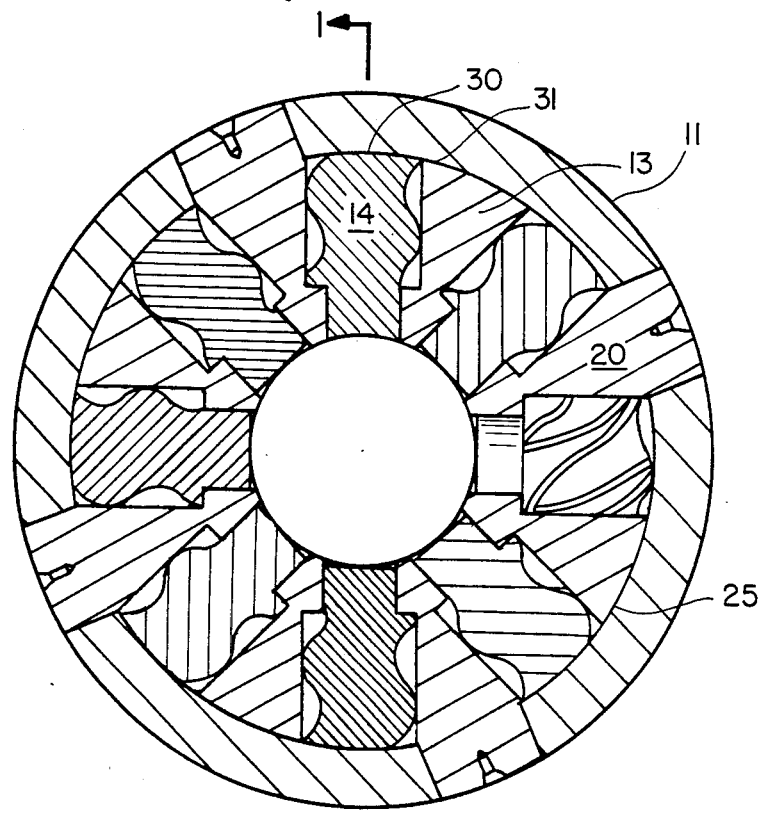
FIG. 2 is a cutaway end view of the differential of FIG. 1 taken generally along lines 2—2 of that figure.

The pinion cage 13 is mounted within the differential case 11. The cage 13 is a structure enclosed by the differential housing or case 11, shaped to support the differential pinions on their outside surfaces and to confine the pinions in meshing engagement with matching side gears. As shown in FIG. 2, four equi-angularly spaced mounting stubs 20 extending off of the outer surface of the pinion cage 13 lock the pinion cage 13 to the case 11 for common rotation therewith. The pinion cage 13 itself is generally ring shaped with two opposed deep annular channels 21,22 in the side surfaces 23 thereof. Eight equi-angularly spaced holes 24 extend into the pinion cage 13 from the outer surface 25 of the pinion cage 13. The innermost portions 26 of the pinion cage holes 24 are of a reduced diameter in respect to the remainder of the holes 24.

The pinions 14 are confined within the holes 24 in the pinion cage 13. The pinions 14 are free to rotate in these holes. The pinions 14 are axially trapped between the inner surface 30 of the case 11 and the reduced diameter portions 26 of the holes 24 in the pinion cage 13. The case 11 and cage 13 thus restrain the pinions 14 from any axial movement. The helically cut teeth 31 of the pinions 14 extend into the two opposed annular channels 21,22 in the sides 23 of the pinion cage 13 for engagement with the side gears 15 (in a manner to be later described).

A pair 40,41 of side gears 15 are located on either side of the pinion cage 13. Each side gear 15 has a helically cut face gear 42, an inner axially aligned opening 43, an inset portion 44 and a flat surface 45 opposing the face gear 42. The helically cut face gear 42 of each side gear 40,41 extends respectively into one of the two annular channels 21,22 in the side surfaces of the pinion cage 13 for engagement with the teeth 31 of the pinions 14. Axles 17 connect to the side gears 15 through a splined interconnection 46 on the inner axially aligned opening 43 of the respective side gear 40,41.

Figure 7:
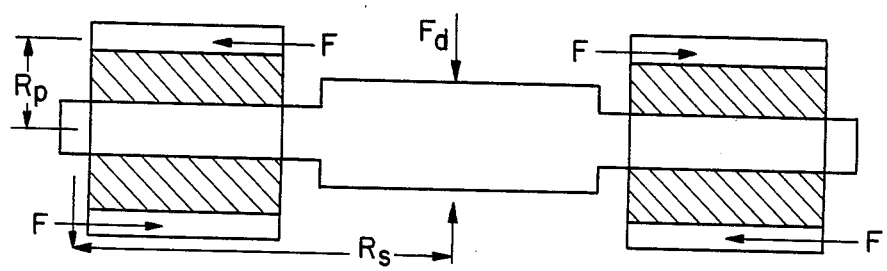
FIG. 7 is a drawing representing the forces present on a pinion shaft of a helical face gear differential.

The capacity of the prior helical face gear differentials, such as that described in U.S. Pat. No. 3,253,483 is seriously limited by the deflection of the pinion support member (spider) from axial forces acting upon the helical teeth of the pinions. Attempts to overcome this problem by increasing the diameter of the pinion support members have not been successful because the deflection forces also increase. Because of the helix angle of the teeth, an axial force F at all pinion teeth in contact with the face side gears produces a "cocking" torque equal to F×Rp (see FIG. 7). Force $F_d$, which causes deflection of the pinion support member (spider) in a 4 pinion differential will be equal to $$F_d = (8 \times F \times R_p)/R_s$$

Where:
 $F_d$ = deflection force on the pinion shaft
 F = axial force at the pinion teeth
 $R_p$ = radius of the pinion teeth
 $R_s$ = radius of the pinion shaft It is apparent that $F_d$ will increase if $R_p$ is increased and $R_p$ must be made larger if the pinion support is made larger in diameter. Other attempts to reduce deflections by reducing the helix angle of the teeth did not work out because of the deterioration in face gear tooth geometry. In the invention of this application, the support of the pinions on their outside surfaces rather than conventional "spider" support increases the capacity of the differential. Up to 8 pinions can be used by supporting them in the holes or "pockets" of the cage structure. The pinions are approximately one half the diameter of pinions in a conventional 4 pinion differential which reduces the deflection forces accordingly. The cage structure is in addition inherently more rigid than a spider. Also, friction forces on the outside diameter of the pinions increases the torque proportioning effect.

In addition to a decrease in the amount of unwanted movement in the differential structure, the cage design makes possible installation of friction plates 16 and preloaded thrust spring 18 located between side gears 15 and case 11.

Figure 5:
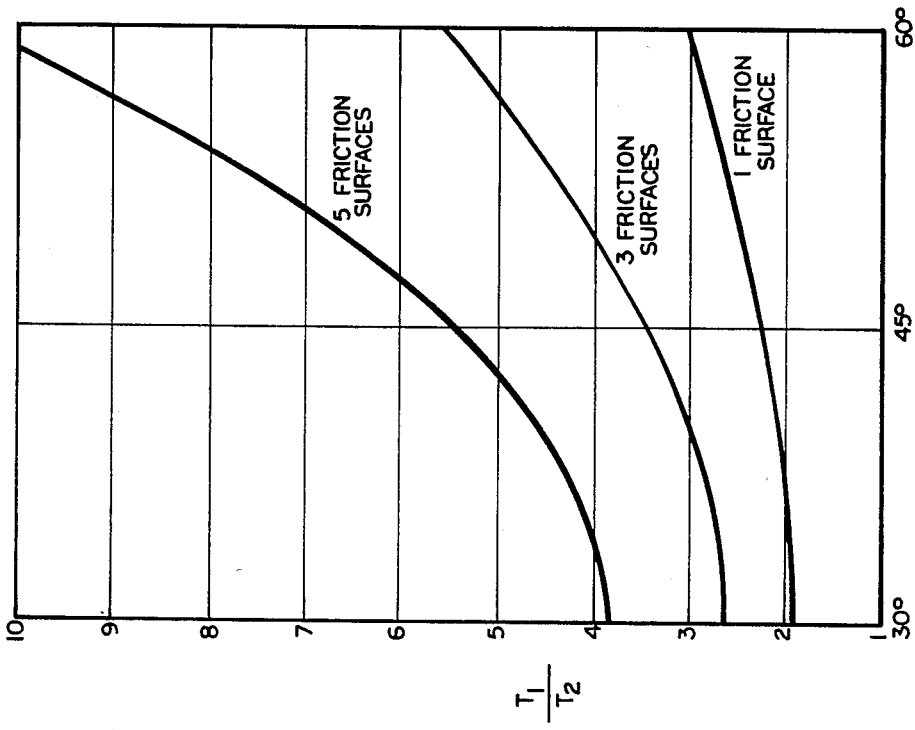
FIG. 5 is a graph of the torque proportioning effect of the differential of FIG. 1 with varying number of friction surfaces and pinion helix angles.

Due to the helical gearing between the pinions 14 and the side gears 15 there is, under driving loading of the differential, ordinarily some sort of movement in the side gears 15 axial thereto. The friction plates 16 are located between the opposing flat surface 45 of the side gears 15 and the case 11. Some 50 of the friction plates 16 are connected to the side gears 15 for rotation therewith. Others 51 of the friction plates 16 are connected to the pinion cage 13 at 52 (or otherwise) for non-rotation. These two sets of plates 50,51 alternate such that the more the side gear 15 moves away from the pinions 14 the more friction there will be between the two sets 50,51 of friction plates 16. This friction produces a torque proportioning effect. A range of the torque proportioning effect can be preselected by the number and composition of the friction plates 16 and, in addition, by the helix angle and pressure angle of the pinion-side gear interface. In general the greater the number of friction plates 16 and the greater the helix angle and/or pressure angle the more the torque proportioning effect will be. For example as shown in FIG. 5 the effect with 5 friction surfaces (as shown in the drawings) with pinion teeth having 45 degree helix angle is roughly two and one-half times the effect with one friction surface. Other teeth shapes and/or configurations could also be used.

Figure 6:
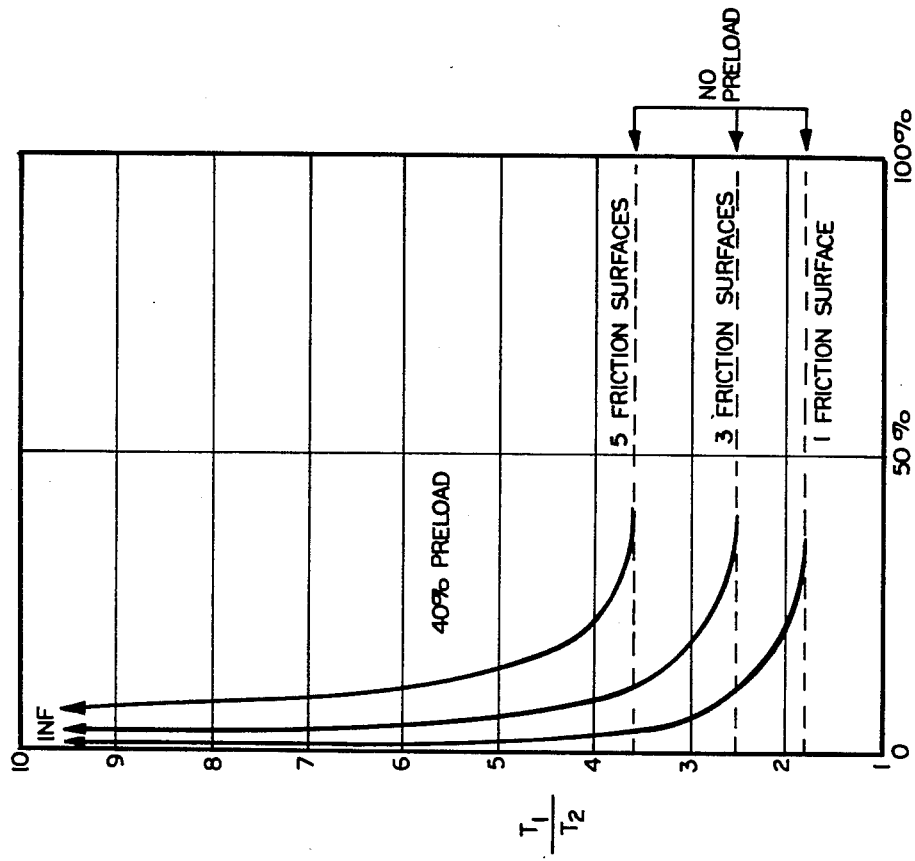
FIG. 6 is a graph of the preloading effect of the differential of FIG. 1 with varying number of friction disks.

The preloading of the differential friction plates 16 allows for one to select a minimum torque proportioning effect. The preloading is accomplished through the use of a wave spring 18 and a thrust washer 19. The wave spring 18 acts between the case 11 and the friction plates 16 to force the friction plates 16 together with a certain degree of force in the opposite direction that the side gears 15 act on the friction plates 16 (i.e. inward not outward). As shown in FIG. 6 this preloading guarantees a certain amount of torque proportioning effect in the differential. The reason for this is that the friction plates 16 do not care how the friction was created, just that it exists. When the movement of the side gears 15 overcomes the force of the chosen have spring 18, the torque proportioning effect is as it would have been had there been no preloading.

At no load, the differential is locked up to the torque limit provided by the preloading of the friction plates. As the differential is loaded, the separating force of the side gears compresses the preloading spring to relieve the internal thrust. FIG. 6 shows the axle shaft torque ratio (T1/T2) to differential load (tractive effort) for the 1, 3 and 5 friction surface configurations and for the "no preload" conditions (thrust spacer and spring removed). The 40% preload means that the spring force will be overcome by the side gear separating force at 40% of the differential rated load.

The preloaded-unloading design is very attractive for vehicles which operate over a wide range of traction conditions as tractive effort is assured even though one wheel may not be in contact with a tractive surface. The thrust spacer 19 between the inset portion 44 of the side gear 15 and the pinion cage 13 also prevents too much movement of the side gear 15 into the pinions 14.

The torque proportioning effect of the improved differential of this application can be mathematically described. As with most differentials, torque transmitted to the case by gears or other means (not shown) give a driving force to the cage which is distributed to the side gears through the pinions. The transmitted axle shaft torque ($T_1$) will be equal to axle shaft torque ($T_2$) when no differential action occurs (as with a vehicle going in a straight line). When differential action is initiated (as with a vehicle turning a corner or losing traction), torque $T_1$ will increase because of friction in the differential and torque $T_2$ will decrease. The ratio of the axle shaft torques is calculated with the following equation:

$$\frac{T_1}{T_2} = \frac{1}{E^2} \times \frac{\left[1 + K_f\left(\frac{Rpm}{Rp} + \frac{\text{Tan } HA}{\text{Cos } PA}\right)\right]\left[1 + \left(K_f \frac{Rsqw \text{ Tan } PA}{Rsg \text{ Cos } HA}\right)\right]}{\left[1 - K_f\left(\frac{Rpm}{Rp} + \frac{\text{Tan } HA}{\text{Cos } PA}\right)\right]\left[1 - \left(K_f \frac{Rsqw \text{ Tan } PA}{Rsg \text{ Cos } HA}\right)\right]}$$

Where:
Kf = coefficient of friction
Rpm = radius of pinion mounting surface
Rp = pitch radius of the pinions
HA = Helix angle
PA = Pressure angle
Rsgw = Average radius of side gear washers
Rsg = Average radius of side gear teeth
E = Efficiency of gear and pinion tooth mesh The foregoing equation can be used to illustrate the advantages of the "caged" helical face gear differential over other types of devices. Several elements of the equation are quite comparable with bevel gear or other differential devices, namely: (E) efficiency, (Kf) coefficient of friction, (Rp) pitch radius of pinion, and (PA) pressure angle. However, the other elements of the equation are different in a manner that identifies the significant design opportunities of the caged helical face gear structure a follows:

1. Rpm is larger than Rp
2. HA may be used between values of 25 degree and 65 degrees
3. Rsgw is larger than obtainable with bevel gears The foregoing equation considers only on friction surface between the side gears and the differential cases. It is evident that an increase in the number of friction surfaces of the side gears will increase the torque proportioning effect. The caged mounting of the small helical pinions makes possible an increase in number of friction surfaces up to five within the space normally available in a bevel gear differential case. Also, the inner hub of the cage provides an ideal thrust surface in preloaded differentials. The FIGS. 5 and 6 graphically describe the results of the above formula for differing configurations.

The caging of the pinion gears with resultant decrease in pinion diameter allows the use of more pinions. This along with the increase in the ratio of the side gear to pinion teeth and the use of minimum helix angles increases the capacity of the differential. The use of the friction surfaces allows design flexibility of torque proportioning effects.

Although the invention has been described in its preferred form with a certain degree of particularity, it is to be understood that numerous changes may be had without departing from the claimed subject matter.

What is claimed is:

1. A torque proportioning differential comprising a differential case, first and second helical face gears coaxially mounted in meshing engagement with a plurality of helical pinions therein, a pinion cage, said pinion cage being separate from said differential case, said pinion cage being nonrotatively mounted to said differential case, said pinion cage having holes, and said helical pinions mounted in said holes in said pinion cage with axes extending substantially radially thereof with said pinion cage supporting said helical pinions on their outside surfaces in meshing engagement with the first and second face gears.

2. The torque proportioning differential of claim 1 wherein said pinion cage is interchangeable with bevel gear differential components.

3. The torque proportioning differential of claim 1 characterized by the addition of friction means, said friction means being engaged between said pinion cage and said face gears.

4. The torque proportioning differential of claim 3 characterized by the further addition of a spring means, said spring means preloading said friction means.

5. A torque proportioning differential comprising a differential case enclosing first and second helical face side gears coaxially mounted in meshing engagement with a plurality of helical pinions, a pinion cage, said pinion cage being separate from said differential case, said pinion cage being mounted in said differential case for rotation therewith, said pinion cage having holes, the axes of said holes extending substantially perpendicular to the axis of rotation of said side gears, and said helical pinions being mounted in said holes for rotation therein with said pinion cage supporting said helical pinions on their outside surfaces in meshing engagement with the first and second face gears.

6. The torque proportioning differential of claim 5 wherein said pinion cage is interchangeable with bevel gear differential components.

7. The torque proportioning differential of claim 5 wherein said helical side gears develop a side thrust and characterized by the addition of friction surfaces, said friction surfaces being respectively connected to said side gears for rotation therewith and means for said side thrust of said helical side gears to engage said friction surfaces so as to produce a torque proportioning effect.

8. The torque proportioning differential of claim 7 characterized in that there are multiple friction surfaces for each side gear.

9. The torque proportioning differential of claim 7 characterized by the addition of a spring means, said spring means preloading said friction surface so as to produce a preloaded torque proportioning effect.

10. A torque proportioning differential comprising a differential case enclosing first and second helical face side gears coaxially mounted in meshing engagement with a plurality of helical pinions, a pinion cage, said pinion cage being separate from said differential case, said pinion cage having stubs extending radially off the outer diameter thereof, said stubs engaging said differential case for nonrotatively connecting said pinion cage to said differential case, said pinion cage having two sides, each of said sides having an annular channel therein, the helical faces of said first and second helical face gears extending respectively into said annular channels, said pinion cage having holes, the axes of said holes extending substantially perpendicular to the axis of rotation of said side gears, said holes opening into said annular channels in said sides of said pinion cage, and said helical pinions being mounted in said holes in said pinion cage for rotation therein.

11. The torque proportioning differential of claim 10 wherein said pinion cage is interchangeable with bevel gear differential components.

12. The torque proportioning differential of claim 10 wherein said stubs are in the same plane as said holes and said stubs are offset in said plane from said holes.

13. The torque proportioning differential of claim 10 wherein said helical side gears develop a side thrust substantially parallel to the axis of rotation of said side gears and characterized by the addition of two pairs of friction plates, one of said two pairs of friction plates being between said first side gear and the differential case and the other of said two pairs of friction plates being between said second side gear and the differential case, one of each pair of friction plates being connected to a respective side gear for rotation therewith and another plate of each pair of friction plates being connected to said pinion cage with the side thrust of said helical side gears engaging the respective pair of friction plates so as to produce a torque proportioning effect.

14. The torque proportioning differential of claim 13 characterized in that each pair of friction plates has more than two friction plates.

15. The torque proportioning differential of claim 13 characterized by the addition of a spring means, said spring means preloading each pair of friction plates so as to produce a preloaded torque proportioning effect.

16. An improvement for a helical differential having a case and helical pinions between helical face side gears, the helical pinions developing a side thrust on the helical face side gears, said improvement comprising a pinion cage, means to connect said pinion cage to the case, means to rotatively mount the helical pinions in said pinion cage, said rotatively mounting means supporting said helical pinions on their outside surfaces in meshing engagement with the first and second face gears, a friction surface, means to connect said friction surface to a helical face side gear for rotation therewith, a second friction surface, means to connect said second friction surface to said pinion cage and means for the side thrust of the helical face side gears to engage said friction surface with said second friction surface so as to produce a torque proportioning effect.

17. The improvement differential of claim 16 characterized by the addition of a spring means, and means for said spring means to preload said friction surface with said second friction surface.

* * * * *